United States Patent [19]

Taylor

[11] Patent Number: 5,226,442
[45] Date of Patent: Jul. 13, 1993

[54] VACUUM/PRESSURE RELEASE VALVE

[76] Inventor: Julian S. Taylor, 8300 SW. 8th, Oklahoma City, Okla. 73128

[21] Appl. No.: 928,604

[22] Filed: Aug. 13, 1992

[51] Int. Cl.⁵ .......................................... F16K 17/196
[52] U.S. Cl. .................................... 137/70; 137/493.4
[58] Field of Search ................ 137/70, 493.3, 493.4, 137/493.5

[56] References Cited

U.S. PATENT DOCUMENTS

| | | | |
|---|---|---|---|
| 2,000,431 | 5/1935 | Aumack | 137/493.4 X |
| 2,203,367 | 6/1940 | Schorer | 137/70 |
| 4,930,536 | 6/1990 | Taylor | 137/70 |
| 4,977,918 | 12/1990 | Taylor | 137/70 |

*Primary Examiner*—John C. Fox
*Attorney, Agent, or Firm*—Robert K. Rhea

[57] ABSTRACT

A combination pressure relief valve is formed by a cylindrical valve body secured to a vessel containing fluid to be monitored. The end of the valve body opposite the vessel is normally closed by superposed dual valves comprising primary and secondary valves closing the valve body against excessive fluid pressure by a cage supported collapsible pin. Openings in the primary valve are normally closed by the spring biased secondary valve but are opened by ambient air pressure on the secondary valve, in the event of fluid pressure below atmospheric in the vessel being monitored.

2 Claims, 4 Drawing Sheets

VACUUM/PRESSURE RELEASE VALVE

BACKGROUND OF THE INVENTION

1. Field of the invention.

This invention relates to relief valves and more particularly to a combination double acting valve responsive to vacuum and/or pressure to prevent explosion or implosion of a fluid containing Vessel.

2. Description of the prior art.

Industrial relief valves are currently used for the release of excess pressure to prevent damage to a vessel or tubular line, the environment or personnel. There is a need for a combination pressure and vacuum relief valve for use on a vessel containing fluid such as carbon dioxide where excessive pressure must be released to prevent explosive damage to the vessel or in the event a drain valve is opened and a vacuum is generated within the vessel to prevent an implosion thereof.

The most pertinent patent is believed to be U.S. Pat. No. 4,977,918, issued Dec. 18, 1990, to Taylor for Pressure/Vacuum Relief Valve. This patent discloses a piston divided cylinder communicating with a vessel at one end, on one side of the piston, and communicating with the atmosphere at its other end on the other side of the piston. The piston has a rod extending through both ends of the cylinder and a cage surrounding a fuse-like pin at respective ends of the cylinder and piston rod which is ruptured in response to excessive pressure in one end of the cylinder or a vacuum in the opposite end of the cylinder to release the pressure or admit atmospheric air to the vessel. The pressure/vacuum relief valve of this patent functions quite well, however, it is bulky in structure and the complexity of its components is not conducive to economy.

This invention provides a compact structurally simplified vacuum/pressure relief valve which releases excess pressure or admits ambient air to a vessel having lower than atmospheric pressure.

SUMMARY OF THE INVENTION

A sleeve-like valve body is provided with an annular outstanding flange at one end for connection with a fluid containing vessel around an opening therein.

The other end portion of the valve body is provided with a seat on its inner wall surface. A plate-like primary valve normally closes the end of the valve body opposite its flange by sealing with the seat. A cage formed by a plurality of standards secured at one end to the valve body flange in circumferentially spaced-apart relation slidably supports the primary valve for movement toward and away from the valve seat. A cage plate interconnects the ends of the standards opposite the valve body.

Pressure responsive collapsible pin means axially interposed between the primary valve and the cage plate normally maintains the primary valve seated on the valve seat. The primary valve is provided with a plurality of central openings and an annular valve seat circumscribing the openings and facing toward the flange end of the valve body.

A secondary plate-like valve normally seals with the annular valve seat around the openings to close the latter. Secondary valve guide rods projecting through the primary valve are surrounded by springs for normally biasing the secondary valve toward its seat.

The principal object of this invention is provide a combination pressure/vacuum relief valve which opens in response to a predetermined value of fluid pressure or opens in response to a predetermined value of low pressure within a vessel.

Figure 1:
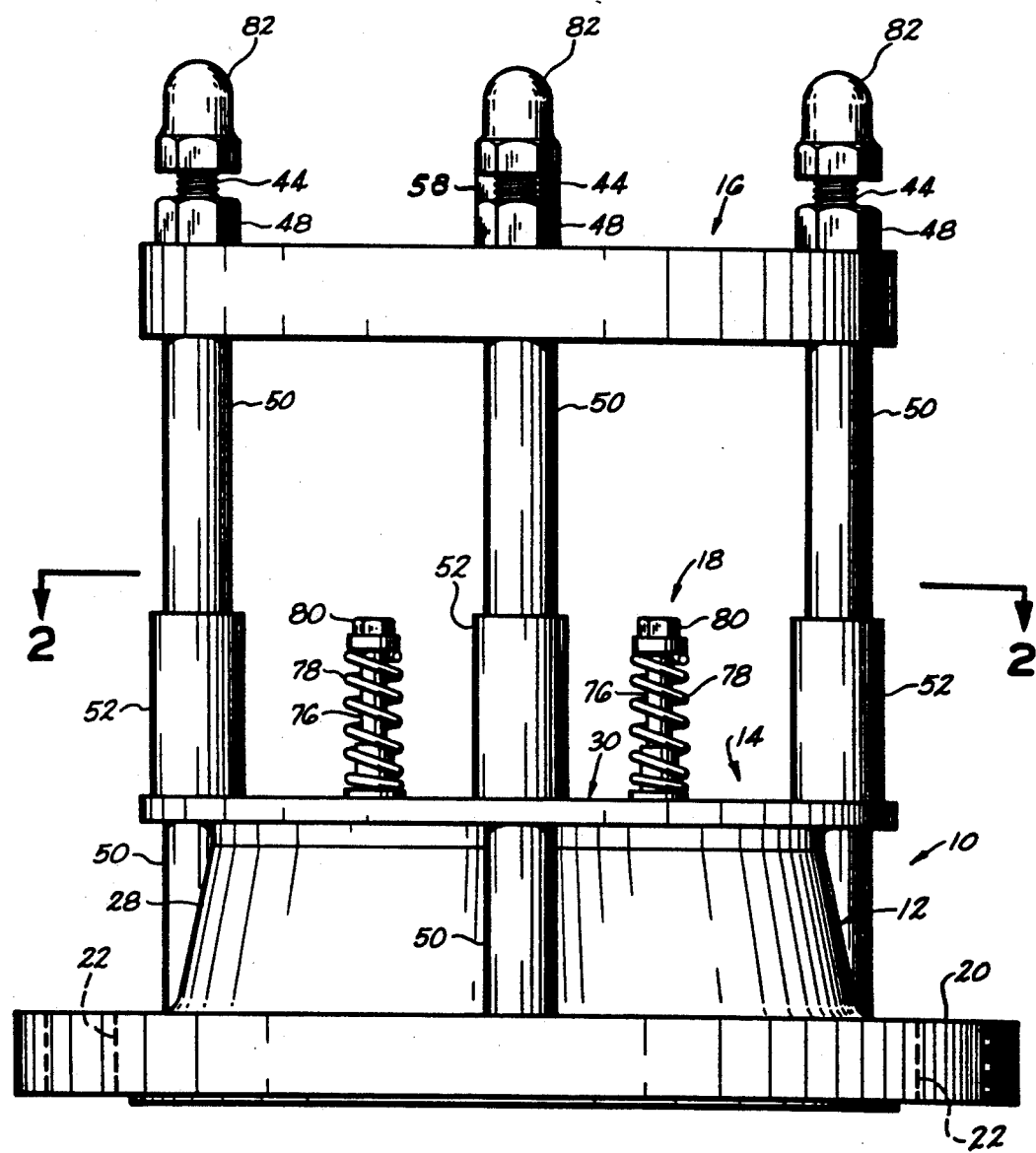
FIG. 1 is an elevational view of the valve.
Figure 2:
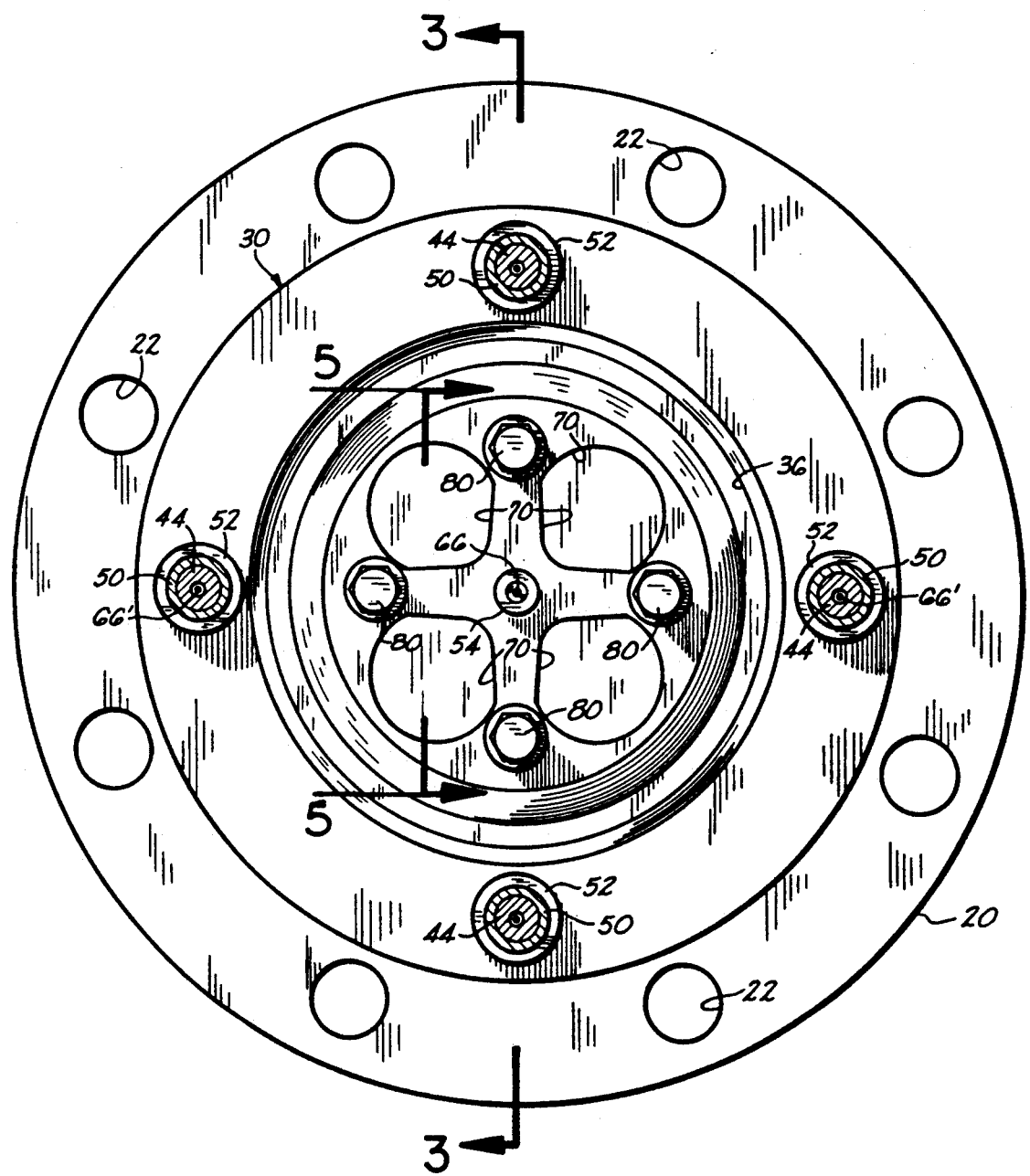
FIG. 2 is a horizontal sectional view, mostly in elevation, taken along the line 2—2 of FIG. 1.

The reference numeral 10 indicates the valve as a whole comprising a sleeve-like valve body 12 forming a fluid passageway 13 closed at one end by dual valve means 14 and pressure/vacuum responsive cage and resilient means 16 and 18 normally maintaining the dual valves in closed position.

The valve body is provided with an outstanding angular flange 20 at one end portion having a plurality of circumferentially spaced holes 22 for receiving bolts, not shown, and connecting the flange to a companion flange on a fluid containing vessel surrounding an opening therein, neither being shown.

The inner wall surface 24 on the sleeve body is generally cylindrical having an annular valve seat 26 at its end portion opposite the flange. The body wall 28 is thickened at its flanged end portion and its outer surface tapers or converges toward the valve seat equipped end to provide rigidity.

The valve means 14 comprises a primary excess pressure release valve means 30 and a secondary vacuum release valve means 32. The primary valve means 30 overlies the end of the valve body wall opposite the flange and is characterized by an outstanding flange 34 radially projecting beyond the perimeter of the valve body wall 28, a selected distance. Inwardly of its flange 34, the primary valve is provided with a substantially V-shaped, in cross section, annular recess 36 defining a central dome-like recess 42 facing the flanged end of the body. The outer surface of the V-shape, as viewed in FIG. 3, forms a seat 38 for sealing with the valve seat 26. The inner wall surface of the V-shape forms the perimeter of the dome-like recess 42 in the inward surface of the primary valve 30 and a valve seat 40 for sealing with the secondary valve 32, as presently explained.

The cage means 16 guides the dual valve means 14 in movement away from the valve body seat 26. The cage means 16 comprises a plurality (four) of bolt-like standards 44 secured at one end to the valve body in circumferential equally spaced-apart relation. A cage plate 46 surrounds the other end portion of the standards 44 and is secured thereto by nuts 48. A spacer sleeve 50, surrounding the respective standard 44, is interposed between the valve body and the cage plate 46. Guide sleeves 52 surround the respective spacer sleeve and are secured at one portion to the primary valve flange 34 for guiding the primary valve in its axial movement toward and away from the valve seat 26. The primary valve is centrally provided with a boss 54 having a socket 56 facing the cage plate 46.

A nut-like pin holder 58 is centrally supported by the cage plate 46 and has its end facing the boss 54 axially bored to form a socket 60. The sockets 56 and 60 respectively support a pair of pin holders 62 and 64 for supporting the respective end portions of an elongated fuse-like or collapsible pin 66 which normally maintains the primary valve seated on the valve seat 26.

The primary valve 30 is provided with a plurality (four) of openings 70 circumferentially spaced around its central boss 54 inwardly of its V-shaped recess 36 for admitting ambient air to the interior of the valve body, as will now be explained.

Figure 3:
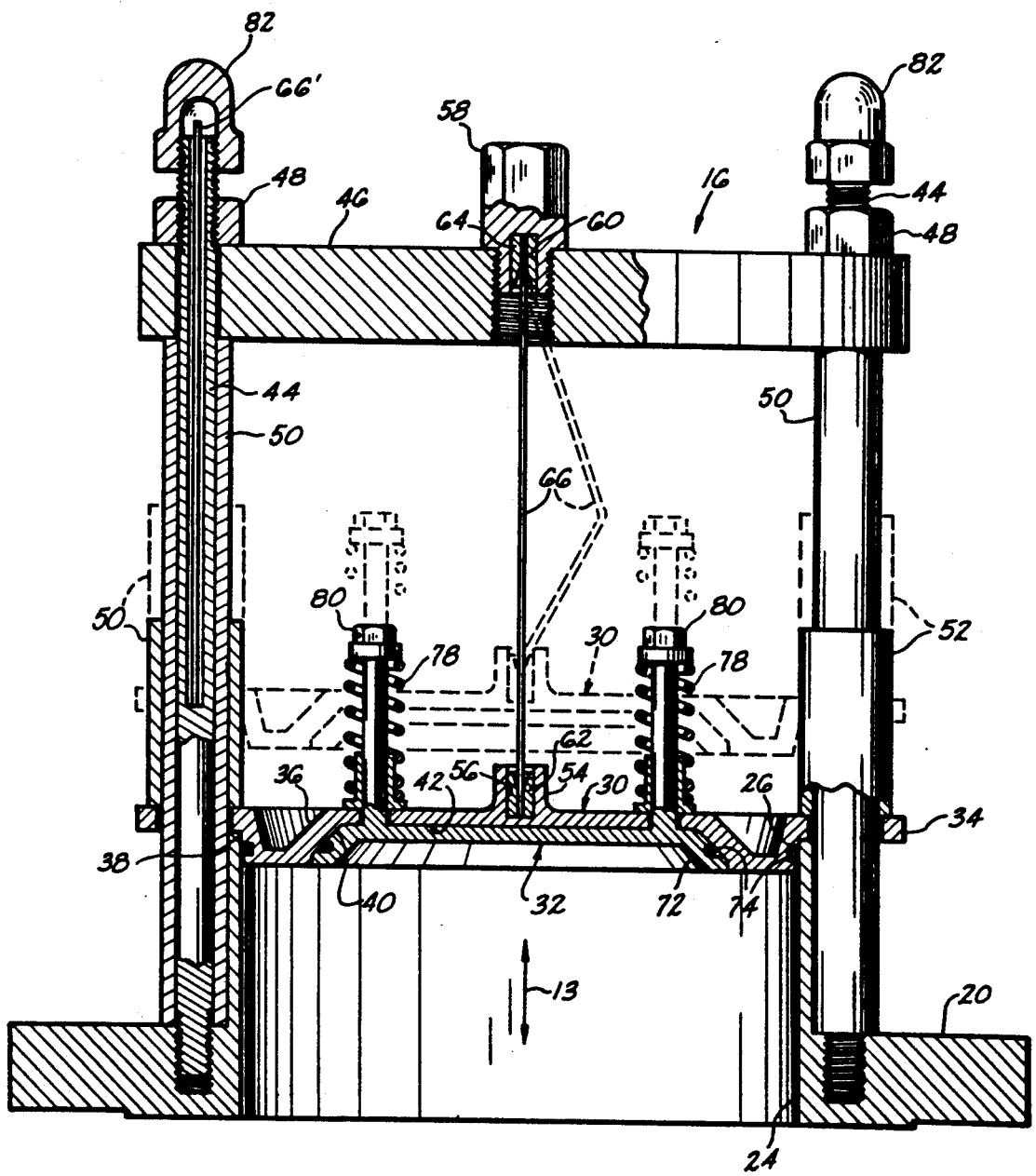
FIG. 3 is a vertical cross-sectional view, partially in elevation, taken substantially along the line 3—3 of FIG. 2 and illustrating, by broken lines, a first valve when opened by excessive pressure.
Figure 5:
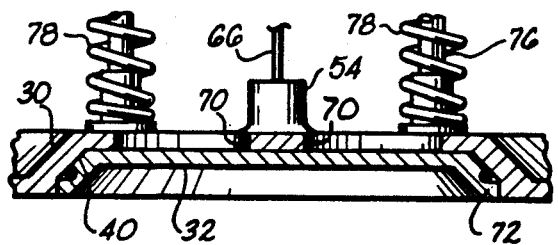

The secondary valve 32 is similarly plate-like and characterized by a downwardly diverging wall 72, as viewed in FIG. 3, and is complimentary received by the dome-like recess 42.

The outer surface of the downwardly diverging secondary valve wall 72 seals with the valve seat 40 on the primary valve 30. O-ring seals 74 on the primary and secondary valves ensure a fluid tight seal between the respective valve and its seat.

A plurality (four) of guide rods 76 are secured to the upper surface of the secondary valve 32 and project upwardly through the primary valve between its openings 70 a selected distance. Each of the rods 76 are surrounded by a helical spring 78 secured to the respective rod by nut and washer means 80. The springs 78 normally bias the secondary valve closed on the valve seat 40 to normally maintain the primary valve openings 70 closed.

The bolt standards 44 are preferably centrally drilled from their ends opposite the valve body to form sockets for receiving a like plurality of spare pins 66' which are held therein by acorn nuts 82, or the like.

OPERATION

Assuming the valve 10 has been connected with a vessel to be protected against explosion or implosion. In the event of excess pressure in the vessel above a predetermined limit the pressure forces the primary valve 30 against the collapsible pin 66 which collapses toward its dotted line position (FIG. 3) and the dual valves 30-32 move toward their dotted line position by the flange 34 and guides sleeves 52 sliding on the guide sleeves 50 and opening the vessel to atmosphere.

Figure 4:
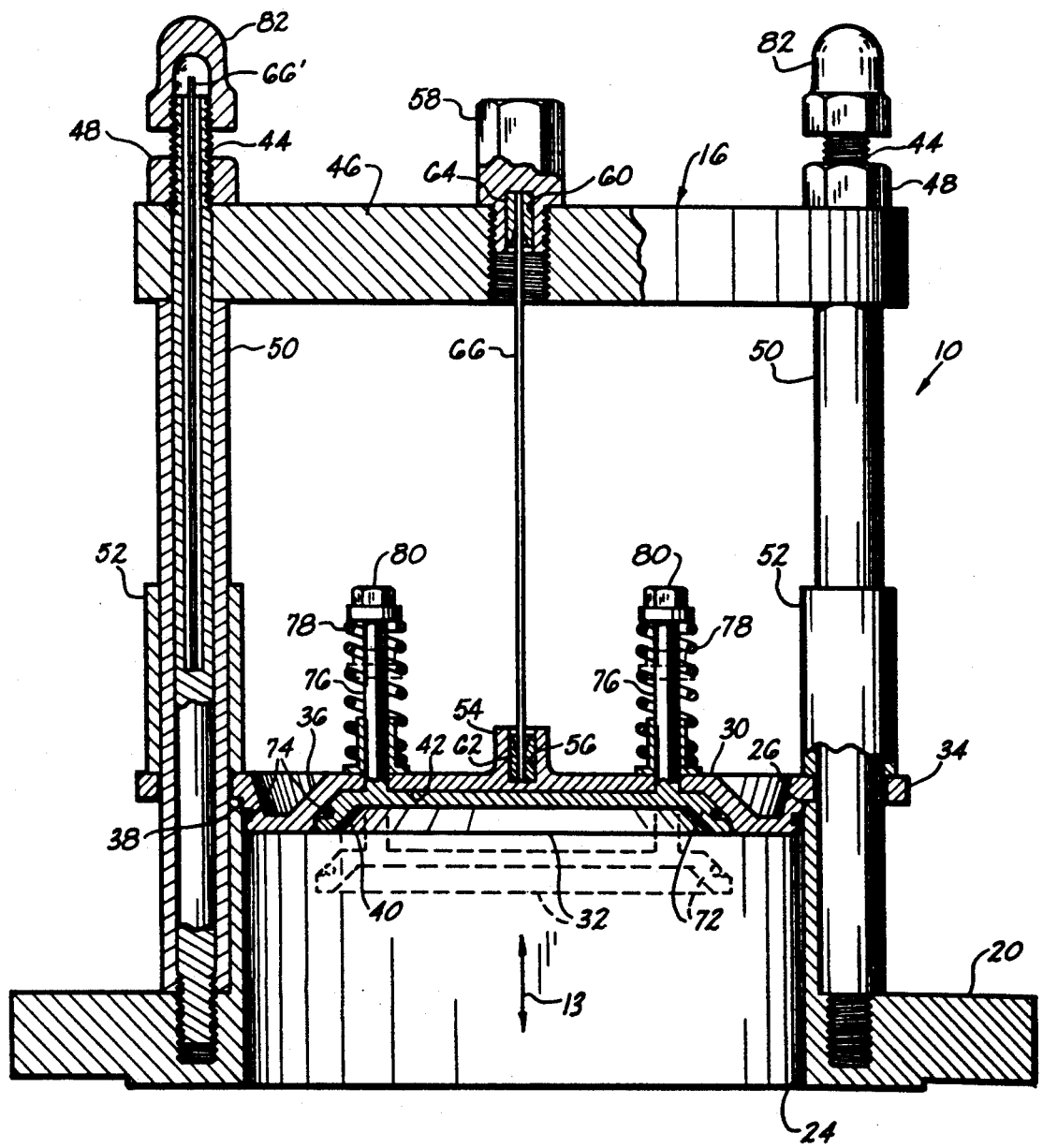
FIG. 4 is a view similar to FIG. 3 illustrating, by broken lines, a second valve when opened in response to low pressure in the valve body; and, FIG. 5 is a fragmentary vertical cross-sectional view taken substantially along the line 5—5 of FIG. 3.

In the event the pressure in the vessel reaches a low value, approaching a vacuum, the ambient air pressure against the top surface of the secondary valve 32, within the primary valve openings 70, overcomes the resistance of the springs 78 to move the secondary valve 32 downward, as viewed in FIG. 4, to its dotted line position, thus opening the interior of the valve body and the vessel to atmosphere through the primary valve openings 70. When the low pressure value in the vessel has been restored to normal, the springs bias the secondary valve 32 to its closed solid line position.

In the event the primary valve has opened in response to excessive pressure and collapsed the pin 66, the primary valve is reset manually by moving the dual valves as a unit to their solid line position on the valve body.

The collapsed pin 66 is replaced by removing the pin nut 58 and installing one of the spare pins 66' and replacing the nut 58.

Obviously the invention is susceptible to changes or alterations without defeating its practicability. Therefore, I do not wish to be confined to the preferred embodiment shown in the drawings and described herein.

I claim:

1. A pressure/vacuum relief valve for a fluid containing vessel, comprising:

valve body means for forming a fluid passageway between an opening in a vessel and the atmosphere, dual valve means comprising cooperating first and second valves normally closing the end of the passageway opposite the vessel and respectively responsive to pressures above and below predetermined values for opening the passageway to the atmosphere;

said valve body further including a wall defining the fluid passageway;

a valve seat on said wall opposite the vessel connected end of the body, said dual valve means further including first valve means characterized by an annular flange projecting in a radial direction beyond the end of the body wall opposite its vessel connected end for normally sealing with said body wall valve seat;

pin and cage means connected with said body for normally maintaining said first valve means seated, said first valve means having a through opening communicating with the fluid passageway;

an annular valve seat on said first valve means circumscribing the opening therein;

second valve means normally sealing with said annular valve seat;

resilient means normally biasing said second valve means toward said annular valve seat.

said pin and cage means further including a plurality of elongated members secured at one end portion with said body in parallel spaced relation and slideably projecting through the first valve means flange in a direction opposite the vessel connected end of the body;

a relatively short sleeve guide, when compared with the length of said members, slidably surrounding said members opposite said body and secured at one end with said first valve means flange;

a cage plate extending between the other end portions of said members; and, a collapsible pin axially interposed between said first valve means and said cage plate.

2. The relief valve according to claim 1 in which the resilient means comprises:

a plurality of valve guides secured at one end portion to said second valve means and slidably projecting through said first valve means; and, spring means surrounding said guides opposite said second valve means.

* * * * *